United States Patent Office 2,864,876
Patented Dec. 16, 1958

2,864,876

IMPROVED PROCESS FOR THE MANUFACTURE OF CHLORINATED RUBBER

Robert M. Brooks, Milltown, N. J., and Vernon R. Grassie, Kennett Square, Pa., assignors to Hercules Powder Company, Wilmington, Del., a corporation of Delaware No Drawing. Application June 27, 1955
Serial No. 518,335

6 Claims. (Cl. 260—772)

This invention relates to an improved method for producing chlorinated rubber.

It is well known, of course, that rubber can be transformed into chlorinated derivatives thereof by treatment of rubber with chlorine under various conditions, the chlorination usually being carried out in a suitable solvent for rubber such as carbon tetrachloride or similar solvent which does not react with the chlorine. When raw or crude rubber is chlorinated, a product is obtained having a very high viscosity, and, therefore, not economical to employ for the preparation of lacquers, varnishes, inks, and the like, requiring a low viscosity chlorinated rubber to be practical. Accordingly, an important problem confronting the art has been, and continues to be, an economical and practical method for producing low viscosity chlorinated rubber. Heretofore, various methods have been proposed for accomplishing this objective, but they have all been deficient for various reasons.

More specifically, it has been proposed to produce chlorinated rubber, capable of forming solutions of low viscosity, by disaggregating rubber by working on a mill and then chlorinating the disaggregated product. Such disaggregation is open to the objections that the viscosity of the disaggregated product is still considerable and higher than desirable. Moreover, such disaggregation requires much time and results in development of undesirable color in the chlorinated rubber. It has also been proposed to reduce the viscosity of the rubber, either raw or previously disaggregated, during the chlorination cycle by introducing an oxygen-containing gas into the chlorination reaction solution. This procedure leaves much to be desired, however, since it does not reduce the viscosity early enough in the process to gain the advantages of working with low viscosity solutions. It has also been proposed to reduce the viscosity of the chlorinated rubber after chlorination is complete by introducing a mixture of chlorine and an oxygen-containing gas into the chlorinated rubber solution, but this process is uneconomical, time consuming, and not subject to uniform control. Previous proposals to reduce the viscosity of the rubber by oxidation prior to chlorination have not been satisfactory because such methods have resulted in chlorinated products having undesirable characteristics, have involved excessive solvent losses, and have not been subject to accurate control.

Heretofore, chlorination of rubber has been characterized by a so-called "break" or separation into two phases during the chlorination. This "break" actually involves a separation of partially chlorinated rubber from solution. Upon continued chlorination, the chlorinated rubber eventually goes back into solution, but during the "break" period the rate of chlorination is greatly reduced. In order to reduce the time during which the chlorination process is in the "break" stage, it has been customary to employ quite high temperatures, even up to 85° C. or 90° C., and hence undesirable solvent losses as well as yield losses have been encountered.

Accordingly, it is the principal object of this invention to provide an improved method for producing chlorinated rubber having great diversity for removing the limitations heretofore existent. Among the objectives accomplished in accordance with this invention are the following:

Provision of a method for chlorinating rubber which is subject to exact and predetermined control of the viscosity of the final chlorinated rubber produced.

Provision of a method for chlorinating rubber which substantially eliminates the "break" during chlorination, heretofore encountered.

Provision of a method for chlorinating rubber which eliminates the necessity for mechanical disaggregation of the rubber prior to chlorination.

Provision of a method for chlorinating rubber of greatly improved efficiency, wherein rubber solutions of substantially higher solids content are chlorinated in less time than heretofore possible, even with solutions of low solids content, wherein solvent losses during chlorination are substantially reduced, wherein mechanical handling through pumps, pipes and filters is greatly facilitated, and wherein chlorination can be accomplished over a broad temperature range heretofore largely impractical because of the "break" or phase separation encountered.

Provision of a method for chlorinating rubber which yields a chlorinated product of improved uniformity.

Other objects of the invention will appear hereinafter, the novel features and combinations being set forth in the appended claims.

Generally described, the present invention comprises passing a stream of inert gas containing up to about 9% by weight of chlorine dioxide into a solution of rubber in a solvent substantially inert to chlorine until the viscosity of the rubber solution has been reduced to a value less than about 5% of the original rubber solution viscosity, and thereafter chlorinating the resulting rubber solution of reduced viscosity at a temperature between about 25° C. and about 70° C. without phase separation during chlorination, until chlorinated rubber having about 66% by weight of chlorine is produced.

In one embodiment of the invention raw crepe rubber is digested and washed in accordance with the digestion and washing method described in U. S. 2,252,728 and is then dried. The resulting dry, digested rubber is then dissolved in a solvent substantially inert to chlorine, such as carbon tetrachloride, and a stream of inert carrier gas, preferably air, containing from about 4% to about 8% of chlorine dioxide is passed into the rubber solution until the viscosity of the rubber solution has been reduced to a value less than about 5% of the original rubber solution viscosity. A stream of chlorine gas is then passed into the resulting rubber solution of reduced viscosity at a temperature between about 25° C. and about 70° C. until chlorinated rubber having a chlorine content of about 66% is produced. The chlorinated rubber is then recovered by precipitation in hot water and the solid chlorinated rubber after washing is freed from water by draining, centrifuging and the like, and is then dried. It is a characteristic of the present invention that chlorination proceeds to completion substantially without phase separation, or a so-called "break," during chlorination.

The general nature of the invention having been set forth hereinabove, the following examples illustrate some typical and specific embodiments thereof. However, these are not to be construed as limiting the invention.

*Example 1*

Nine hundred twenty pounds of crepe rubber, after being digested, washed and dried in accordance with the procedure set forth in Example 2 of U. S. Patent 2,252,728 to John Merriam Peterson, was then milled for 10 minutes on heated, corrugated rolls. This rubber was then dissolved in carbon tetrachloride to produce a solution containing 4.4% by weight of rubber, and having an initial viscosity of 470 seconds at 25° C., as measured by the time for a 20 ml. pipette having the tip cut off to empty (hereinafter referred to as the pipette viscosity).

This rubber solution was brought to a temperature of 31° C. and maintained at this temperature while passing a dry stream of air containing 4.9% by weight of chlorine dioxide into the rubber solution. The chlorine dioxide-containing gas stream was passed into the solution at a rate equivalent to 1.0 pound of chlorine dioxide per hour until the pipette viscosity of the rubber solution was reduced to 5 seconds, which value is equal to approximately 1.16% of the original rubber solution viscosity. Chlorine dioxide consumption amounted to 0.64 lb. per 100 lb. of rubber treated.

The chlorine dioxide was generated immediately before use by means of a standard Olin-Mathieson chlorine dioxide generator (Olin-Mathieson Chemical Corporation, 460 Park Avenue, New York, New York). This is a dry type generator in which metered streams of dry air and dry chlorine gas are mixed and then passed through a column of dry sodium chlorite to generate chlorine dioxide. The chlorine is converted substantially quantitatively into chlorine dioxide according to the following equation:

$$2NaClO_2 + Cl_2 \rightarrow 2ClO_2 + 2NaCl$$

The air is simply an inert carrier gas for the chlorine dioxide.

The resulting rubber solution of reduced viscosity was then charged to a chlorinating vessel and was chlorinated by passing a stream of chlorine gas into the rubber solution while applying cooling water to the jacket of the chlorinating vessel to hold the temperature of the chlorination reaction mixture at about 70° C. or slightly under 70° C. This was necessary in view of the vigorous exothermic character of the chlorination reaction. Chlorination proceeded smoothly and uniformly to completion without phase separation during chlorination. Chlorination was continued until test indicated completion of the chlorination reaction. This can be readily ascertained by a sharp increase in the chlorine gas content of the off-gas from the chlorination reaction. Another quick control method consists in adding 3 ml. of 98% sulfuric acid and 5 ml. of ethylene bromide to a 3.8 gram sample of the chlorination dope in a ⅝ x 6 inch test tube and heating the mixture with constant stirring for 5 minutes in a boiling water bath. If chlorination is incomplete, the mixture turns black indicating the presence of unsaturation in the rubber and, therefore, incomplete chlorination. On the other hand, a completely chlorinated rubber contains substantially no unsaturated linkages. Accordingly, when the chlorination dope contains substantially completely chlorinated rubber, the above control test will be negative for unsaturation. The mixture in the test tube separates into two layers, and the bottom layer will at most be only light tan in color.

Upon completion of chlorination, absorbed chlorine and hydrogen chloride in the chlorinated dope were largely removed by distillation, after which the chlorination dope was run into hot water to precipitate the chlorinated rubber. The total chlorination cycle, including time to charge the rubber solution to the chlorinator, actual chlorination time, and time required to distill off absorbed hydrogen chloride and chlorine from the chlorination dope after completion of chlorination was 7.9 hours.

After removal of residual carbon tetrachloride by further treatment of the precipitated product with hot water near the boiling point, and washing the product with water to remove residual acidity, the product was drained and dried.

The resulting product upon analysis was found to contain 66.5% chlorine by weight, and a viscosity of 22 centipoises as measured in a 20% toluene solution at 25° C.

*Examples 2–8*

Following substantially the procedure set forth in Example 1, a number of runs were made wherein type, prior treatment, and concentration of rubber were varied, wherein concentration of chlorine dioxide and rate of treatment and temperature of treatment with chlorine dioxide were varied. The following table sets forth pertinent data with respect to these variables, together with viscosity data on the treated rubber solutions and data on the chlorinated products obtained. Substantially no phase separation during chlorination was encountered in these runs.

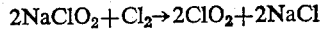

|  | Example Numbers | | | | | | |
|---|---|---|---|---|---|---|---|
|  | 2 | 3 | 4 | 5 | 6 | 7 | 8 |
| Type of Rubber [1] | (a) | (a) | (b) | (b) | (b) | (b) | (b) |
| Rubber weight, lb | 980 | 1,360 | 1,000 | 1,040 | 1,060 | 960 | 1,220 |
| Rubber concentration in carbon tetrachloride solution, percent by wt. | 5.2 | 6.6 | 4.9 | 4.8 | 4.8 | 4.5 | 5.9 |
| Temp. of rubber solution during chlorine dioxide treatment, °C. | 60 | 29 | 34 | 28 | 40 | 60 | 61 |
| Original viscosity of rubber solution, pipette viscosity, seconds. | 340 | 1,250 | 1,900 | 1,800 | 3,600 | 1,100 | 1,700 |
| Viscosity of rubber solution after chlorine dioxide treatment, pipette viscosity, seconds. | 5.1 | 26 | 5.0 | 20 | 18.5 | 4.8 | 13.5 |
| Viscosity of rubber solution after chlorine dioxide treatment as percentage of original viscosity. | 1.5 | 2.4 | 0.26 | 1.1 | 0.51 | 0.44 | 0.79 |
| Chlorine dioxide concentration in inert carrier gas (air) stream, percent by wt. | 4.7 | 3.8 | 7.9 | 7.2 | 7.7 | 7.7 | 7.3 |
| Rate of chlorine dioxide introduction into rubber solution, pounds per hour. | 1.0 | 0.81 | 1.65 | 1.55 | 1.04 | 0.97 | 0.40 |
| Chlorine dioxide consumption, pounds per 100 pounds of rubber. | 0.30 | 0.35 | 0.59 | 0.37 | 0.29 | 0.30 | 0.18 |
| Total chlorination cycle, hours [2] | 7.8 | 15.6 | 8.6 | 9.5 | 10.3 | 9.1 | 9.6 |
| Degree of chlorination in final chlorinated rubber product, percent by wt. of chlorine. | 67.5 | 66.0 | 66.2 | Approx. 67 | Approx. 67 | Approx. 67 | Approx. 67 |
| Viscosity of chlorinated rubber, cps. [3] | 30.6 | 57.4 | 28.0 | 57 | 22 | 30 | 7 |
| Air introduced into chlorination mixture during chlorination. | None | None | None | 15 lb. per hr. for 48 min. | 15 lb. per hr. for 12 min. | 15 lb. per hr. for 24 min. | 12 lb. per hr. for 192 min. |

[1] (a) Indicates crepe rubber which was digested, washed and dried according to Example 2 of U. S. Patent 2,252,728, and then milled for 10 minutes on heated, corrugated rolls. (b) Indicates crepe rubber which was digested, washed and dried according to Example 2 of U. S. Patent 2,252,728, but which received no milling treatment after drying.
[2] The total chlorination cycle includes time to charge rubber solution to chlorinator, actual chlorination time and time required to distill off absorbed hydrogen chloride and chlorine from the chlorination dope after completion of chlorination.
[3] Measured on 20% by weight chlorinated rubber solution in toluene at 25° C.

In Examples 1–8, inclusive, above, the average weight of rubber chlorinated was approximately 1067 lb. The average overall chlorination cycle in these examples was 9.8 hours. In previous practice, without the benefit of this invention, an average of 825 lb. of rubber could be chlorinated in an average time of 9.9 hours for the overall chlorination cycle. The increase in chlorinator capacity in accordance with this invention was, therefore, approximately 29%, based on prior practice. At the same time, carbon tetrachloride losses were materially lower than in prior practice, and handling of the rubber solutions and partially chlorinated rubber dopes in plant equipment including pumps, pipes, filters, chlorination vessels, etc., was greatly facilitated in comparison to prior art practice.

*Examples 9 and 10*

Raw crepe rubber which had not received any prior digestion or milling treatment was employed in these examples, employing substantially the procedure set forth in Example 1. Pertinent data on these examples, similar to the data set forth for Examples 2–8, are presented in the following table. Substantially no phase separation during chlorination was encountered in these examples employing raw crepe rubber having no prior digestion or milling treatment.

|  | Example Numbers | |
|---|---|---|
|  | 9 | 10 |
| Type of Rubber [1] | (c) | (c) |
| Rubber weight, lb | 800 | 825. |
| Rubber concentration in carbon tetrachloride solution, percent by wt. | 3.9 | 4.0. |
| Temperature of rubber solution during chlorine dioxide treatment, °C. | 54–55 | 58–60. |
| Original viscosity of rubber solution, pipette viscosity, seconds. | 5,000 | 7,500. |
| Viscosity of rubber solution after chlorine dioxide treatment, pipette viscosity, seconds. | 4.6 | 39. |
| Viscosity of rubber solution after chlorine dioxide treatment as percentage of original viscosity. | 0.092 | 0.52. |
| Chlorine dioxide concentration in inert carrier gas (air) stream, percent by wt. | 6.4 to 7.7 | 8.1. |
| Rate of chlorine dioxide introduction into rubber solution, pounds per hr. | 0.902 | 0.94. |
| Chlorine dioxide consumption, pounds per 100 pounds of rubber. | 0.28 | 0.17. |
| Total chlorination cycle, hrs [2] | 9.68 | 9.17. |
| Degree of chlorination in final chlorinated rubber product, percent by wt. of chlorine. | 66.1 | Approx. 67. |
| Viscosity of chlorinated rubber, cps.[3] | 5 | 887. |
| Air introduced into chlorination mixture during chlorination. | 15 lb. per hr. for 320 min. | None. |

[1] (c) Indicates raw crepe rubber which had not received any prior digestion or milling treatment.
[2] The total chlorination cycle includes time to charge rubber solution to chlorinator, actual chlorination time, and time required to distill off absorbed hydrogen chloride and chlorine from the chlorination dope after completion of chlorination.
[3] Measured on 20% by weight chlorinated rubber solution in toluene at 25° C.

It is important to point out that without chlorine dioxide treatment to reduce rubber viscosity in the manner contemplated by this invention, it becomes economically impractical to employ raw crepe rubber because of the extremely low solids concentration which could be handled through the chlorination process.

An important and necessary feature of this invention involves passing a stream of inert gas containing up to 9% by weight of chlorine dioxide into a solution of rubber in a solvent substantially inert to chlorine until the viscosity of the rubber solution has been reduced to a value less than about 5% of the original rubber solution viscosity.

Ordinarily, it is preferred to stir the rubber solution vigorously while bubbling the gas stream containing the chlorine dioxide into the solution, and it has been found that the amount of reduction of rubber viscosity is directly proportional to the amount of chlorine dioxide which has been added to the rubber solution when all other factors are held constant. Because of this fact, it is possible to calculate and predetermine with accuracy the amount of chlorine dioxide necessary to produce a chlorinated rubber product of any desired viscosity.

Since chlorine dioxide in high concentrations is explosive, it is necessary to generate the chlorine dioxide and entrain it immediately with a large excess of an inert carrier gas. A very convenient method for generating chlorine dioxide is set forth in Example 1. Suitable inert carrier gases for the purposes of this invention include air, nitrogen, waste combustion gases from heat boilers, neon, helium, argon, or any other gas which is substantially inert to chlorine dioxide under the conditions employed in practicing this invention. Air is the preferred inert carrier gas.

The explosive nature of chlorine dioxide in concentrations of about 14% by weight and above limits the safe operating level at about 8 to 9% by weight of chlorine dioxide in the inert carrier gas. Concentrations of chlorine dioxide in air as low as 0.1% by weight or even less are operative in accordance with this invention, but concentrations below about 4% by weight are not practical because of the large amount of entraining gas involved. Accordingly, preferred concentrations are within the range between about 4% and about 8% by weight.

For optimum results the rate of chlorine dioxide introduction into the rubber solution should be in the neighborhood of about one pound of chlorine dioxide per hour on the basis of a charge of approximately 1000 lb. of rubber. However, from the standpoint of operability in this invention, there is no limitation on the rate of introduction of chlorine dioxide into the rubber solution. For practical reasons, however, it is not advisable to employ very low rates because of the excessive time involved, or excessively high rates because of the possibility of losses of chlorine dioxide due to absorption inefficiencies. A practical operating range is between about 0.4 and about 1.65 lb. per hour based on a 1000 lb. charge of rubber.

Any rubber which can be dissolved in a solvent substantially inert to chlorine is suitable in practicing this invention. Thus, by way of example, the rubber employed can be crude crepe rubber or smoked sheet rubber, as they appear on the market, or either of these, as well as cheap low grades of rubber, which have been given a purifying digestion and washing treatment to remove various natural impurities, as well as various synthetic rubbers. If desired, the rubber can be given a hot milling treatment to effect a partial breakdown of rubber viscosity prior to dissolving the rubber in solvent. However, it is presently preferred to employ a purified rubber such as crepe rubber which has been given a digestion and washing treatment to remove natural impurities, and is then dried, but which has not been given a milling treatment on hot rolls after drying to disaggregate the rubber. Suitable digestion methods are disclosed in U. S. Patents 2,252,728, 2,401,133, and 2,401,194.

Prior to treatment with chlorine dioxide, the rubber is dissolved by any suitable means in a solvent which is substantially inert to chlorine. Suitable solvents include, by way of example, carbon tetrachloride, tetrachloroethane, ethylene dichloride, chloroform, and the like. Carbon tetrachloride is the preferred solvent for the purposes of this invention.

The preferred concentration of rubber in solution is between about 4% and about 8% by weight. However, for some purposes, solutions containing appreciably more than 8% by weight of rubber can be employed, if desired. The limiting factor controlling the upper amount of rubber which can be employed is the ability to stir the solution, and with present equipment this upper limit is approximately 15% by weight. Rubber concentrations below 4% by weight are operative, but not economical because of the small amount of rubber being treated in relation to the amount of solvent involved.

From the standpoint of operability in this invention, there is no limitation on the temperature of the rubber solution into which chlorine dioxide is introduced, for chlorine dioxide is effective in reducing the viscosity of the rubber solution at any temperature. However, temperatures above about 65° C. are not advisable because the rubber solvent employed is volatilized at an excessive rate. Low temperatures, below ordinary room temperatures, are likewise not advisable because at such temperatures reaction rate of chlorine dioxide with rubber is slow and rubber solution viscosities become excessively high. A practical operating range is between about 25° C. and about 65° C. For optimum results, a temperature between about 30° C. and about 65° C. is preferred.

It is important and necessary to reduce the viscosity of the rubber solution to a value less than about 5% of the original rubber solution viscosity with chlorine dioxide, in order to subsequently chlorinate the rubber in solution without encountering a "break" or phase separation during chlorination. The course of viscosity reduction can be readily followed by means of the pipette viscosity method set forth in Example 1. For most purposes, it is preferred to reduce the rubber solution viscosity to a value less than about 2.5% of the original rubber solution viscosity.

Chlorination of the rubber solution of reduced viscosity in accordance with this invention is conducted at temperatures between about 25° C. and about 70° C. without a "break" or phase separation during chlorination. For optimum results it is preferred to conduct the chlorination at a temperature between about 60° C. and about 70° C. This makes possible a rapid, uniform chlorination with minimum solvent losses. If desired, chlorination may be conducted in the presence of ultraviolet light, but this is not necessary. In all other respects, chlorination follows customary prior art practice, and is continued until control tests, as set forth in Example 1, indicate that chlorinated rubber of about 66% chlorine by weight has been produced. Recovery, washing, bleaching, stabilization and drying of the chlorinated rubber product follow customary prior art practice, and, therefore, do not require detailed discussion in this specification.

From the foregoing description, it will be apparent that the advantages of the invention are multifold. The principal advantage resides in the attainment of the objectives as hereinbefore set forth in providing a novel and improved method for chlorinating rubber which overcome important disadvantages of the prior art.

What we claim and desire to protect by Letters Patent is:

1. The process for producing chlorinated rubber which comprises passing a stream of inert gas containing chlorine dioxide in an amount up to about 9% by weight in a stirrable solution of rubber containing up to about 15% by weight of said rubber in a volatile chlorinated aliphatic hydrocarbon solvent substantially inert to chlorine until the viscosity of the rubber solution has been reduced to a value less than about 5% of the original rubber solution viscosity, and subsequently chlorinating the resulting rubber solution of reduced viscosity at a temperature between about 25° C. and about 70° C. without phase separation during chlorination until chlorinated rubber having about 66% by weight of chlorine is produced.

2. The process of producing chlorinated rubber which comprises passing a stream of air containing from about 4% to about 8% by weight of chlorine dioxide into a stirrable solution of rubber containing up to about 15% by weight of said rubber in a volatile chlorinated aliphatic hydrocarbon solvent substantially inert to chlorine until the viscosity of the rubber solution has been reduced to a value less than about 5% of the original rubber solution viscosity, and subsequently chlorinating the resulting rubber solution of reduced viscosity at a temperature between about 25° C. and about 70° C. without phase separation during chlorination until chlorinated rubber having about 66% by weigh of chlorine is produced.

3. The process of producing chlorinated rubber which comprises passing a stream of air containing from about 4% to about 8% by weight of chlorine dioxide into a stirrable solution of rubber containing up to about 15% by weight of said rubber in a volatile chlorinated aliphatic hydrocarbon solvent substantially inert to chlorine at a temperature between about 25° C. and 65° C. until the viscosity of the rubber solution has been reduced to a value less than about 5% of the original rubber solution viscosity, and subsequently chlorinating the resulting rubber solution of reduced viscosity at a temperature between about 25° C. and about 70° C. without phase separation during chlorination until chlorinated rubber having about 66% by weight of chlorine is produced.

4. The process of producing chlorinated rubber which comprises passing a stream of air containing from about 4% to about 8% by weight of chlorine dioxide into a stirrable solution of raw crepe rubber containing up to about 15% by weight of said rubber in carbon tetrachloride at a temperature between about 25° C. and about 65° C. until the viscosity of the rubber solution has been reduced to a value less than about 5% of the original rubber solution viscosity, and subsequently chlorinating the resulting rubber solution of reduced viscosity at a temperature between about 25° C. and about 70° C. without phase separation during chlorination until chlorinated rubber having about 66% by weight of chlorine is produced.

5. The process of producing chlorinated rubber which comprises passing a stream of air containing from about 4% to about 8% by weight of chlorine dioxide into a stirrable solution of rubber, digested and washed to remove natural impurities, containing up to about 15% by weight of said rubber in carbon tetrachloride at a temperature between about 25° C. and about 65° C. until the viscosity of the rubber solution has been reduced to a value less than about 5% of the original rubber solution viscosity, and subsequently chlorinating the resulting rubber solution of reduced viscosity at a temperature between about 25° C. and about 70° C. without phase separation during chlorination until chlorinated rubber having about 66% chlorine by weight is produced.

6. The process of producing chlorinated rubber which comprises passing a stream of air containing from about 4% to about 8% by weight of chlorine dioxide into a solution containing from about 4% to about 8% of rubber, digested and washed to remove natural impurities, in carbon tetrachloride at a temperature between about 25° C. and about 65° C. until the viscosity of the rubber solution has been reduced to a value less than about 5% of the original rubber solution viscosity, and subsequently chlorinating the resulting rubber solution of reduced viscosity at a temperature between about 25° C. and about 70° C. without phase separation during chlorination until chlorinated rubber having about 66% chlorine by weight is produced.

References Cited in the file of this patent

UNITED STATES PATENTS

| 1,826,275 | Dyche-Teague | Oct. 6, 1931 |
| 2,020,076 | Mollney | Nov. 5, 1935 |
| 2,037,599 | Schweitzer | Apr. 14, 1936 |
| 2,140,715 | Peterson | Dec. 20, 1938 |

FOREIGN PATENTS

| 671,499 | Great Britain | May 7, 1952 |
| 685,020 | Great Britain | Dec. 31, 1952 |

OTHER REFERENCES

Mellor: "Comprehensive Treatise on Inorganic Chemistry," vol. II, Longmans, Green and Co., 1922, page 288.